Patented Jan. 13, 1942

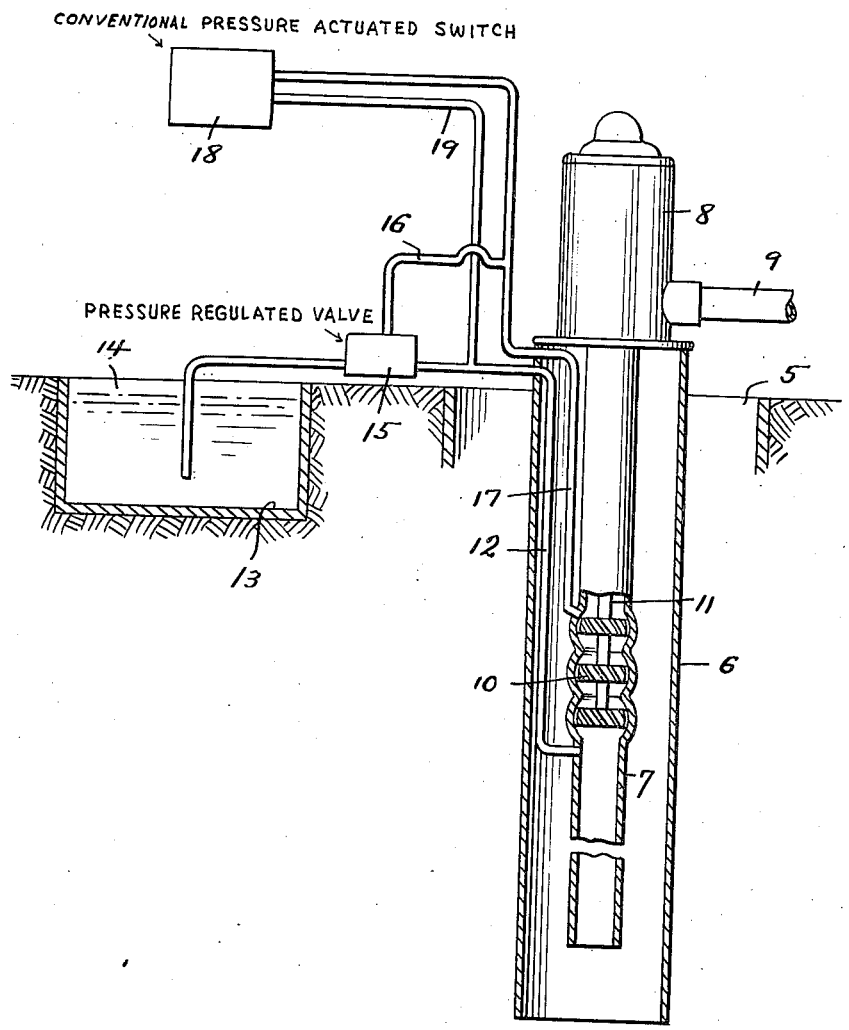

2,270,146

UNITED STATES PATENT OFFICE 2,270,146

WELL PUMP

Jesse Oliver Steele, Lund, Utah

Application March 13, 1940, Serial No. 323,821

1 Claim. (Cl. 137—165)

The present invention relates to means for mixing liquids in pumping systems such as irrigation projects, industrial plants and the like and has for its primary object to provide an auxiliary suction feed connection adjacent the intake end of the pump whereby to provide means for feeding an auxiliary supply of liquid for mixing with the water or other liquid drawn into and discharged from the pump.

The present invention is designed particularly for use in irrigation projects in which a supply of water is pumped from a well or other reservoir for distributing to the irrigation ditches, and an important object of the present invention is to provide means for supplying a liquid fertilizer to the intake end of the pump for mixing with the water as the same is pumped from the well whereby to irrigate as well as fertilize the soil simultaneously.

A further object is to provide an apparatus of this character of simple and practical construction, which is efficient and reliable in use, relatively inexpensive to manufacture and install in operation and otherwise well adapted for the purposes for which the same is intended.

Other objects and advantages reside in the details of construction as more fully hereinafter described and claimed, reference being had to the accompanying drawing forming part hereof, wherein like numerals refer to like parts throughout, and in which—

The figure represents a vertical sectional view through the well and the liquid fertilizer supply tank and showing the pipe system connecting the same with the intake end of the pump mounted in the well.

Referring now to the drawing in detail, the numeral 5 designates an open well within which the pump casing 6 is suspended in a suitable manner, the casing having the pump feed pipe 7 supported concentrically therein at the upper end of which is arranged the pump 8 of conventional construction and from which the discharge pipe 9 extends.

The pump mechanism is of conventional construction and in the present embodiment is illustrated a plurality of vertically spaced impellers 10 mounted on the pump shaft 11 and having a working fit in the pipe 7 of the pump, the impellers serving to draw the water from the well upwardly through the pipe 7 for discharging the same through the pipe 9.

Connected to the pipe 7, at a point immediately below the impellers 10, is a suction feed pipe 12 which extends upwardly in the casing 6 to the surface of the ground and has its upper end extended downwardly into a surface tank 13 within which liquid fertilizer 14 is contained.

In the operation of the device it will be apparent that upon the operation of the pump 8 that the water from the well will be drawn upwardly through the pipe 7 and the operation of the impellers will create a suction in the pipe 12 whereby to draw a predetermined amount of the liquid fertilizer 14 into the pipe 7 for mixing with the water as the same is drawn upwardly by the impellers and subsequently discharged through the pipe 9.

Arranged in the suction pipe 12 is a suitable pressure regulated valve indicated generally at 15 arranged for actuation through the pressure generated in the pump by the impellers 10 and conveyed to the valve 15 by means of a branch pipe 16 connected to a pressure line 17 connected to the pump pipe 7 immediately above the impellers 10. The pressure feed pipe 17 extends to a conventional pressure actuated switch 18 having a return pipe 19 connected to the suction pipe 12 at the discharge end of the valve 15. It will accordingly be apparent that the pressure from the impellers can be utilized to control the pressure actuated switch 18 as well as the pressure regulated valve 15 for the suction pipe 12 leading to the auxiliary liquid fertilizer tank 13.

Actuation of the switch by pressure in the pipe 17 controls an electric circuit in which the switch is connected. It is believed the details of construction, operation and advantages of the device will be readily understood without further detailed discussion.

Having described the invention, what I claim is:

In combination, a pump having an intake pipe extending downwardly into a reservoir, said pipe having an impeller mounted therein, a second intake pipe connected to the first named intake pipe below the impeller and extending upwardly into a second reservoir to draw liquid from the second reservoir into the intake pipe by suction created therein by the impeller, a pressure regulated valve in the second intake pipe for controlling communication therethrough and a pressure pipe connected to said first-named intake pipe above the impeller and operatively connected to the valve.

JESSE OLIVER STEELE.